United States Patent Office 3,169,111
Patented Feb. 9, 1965

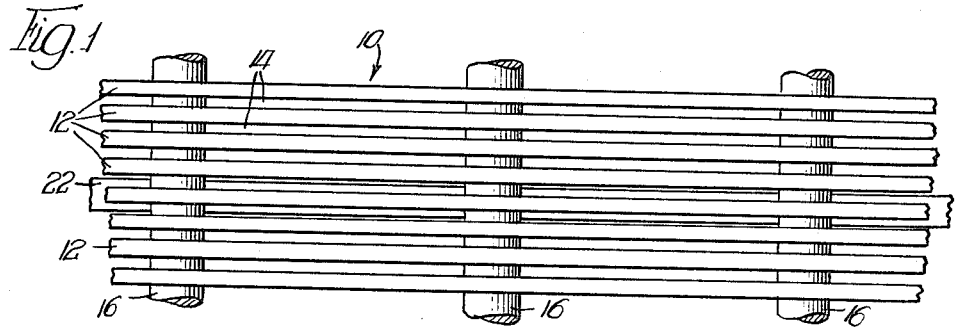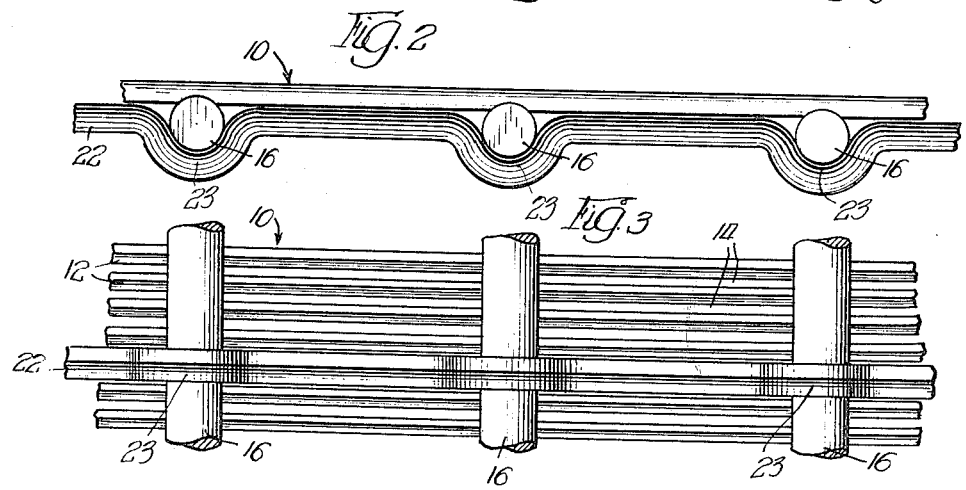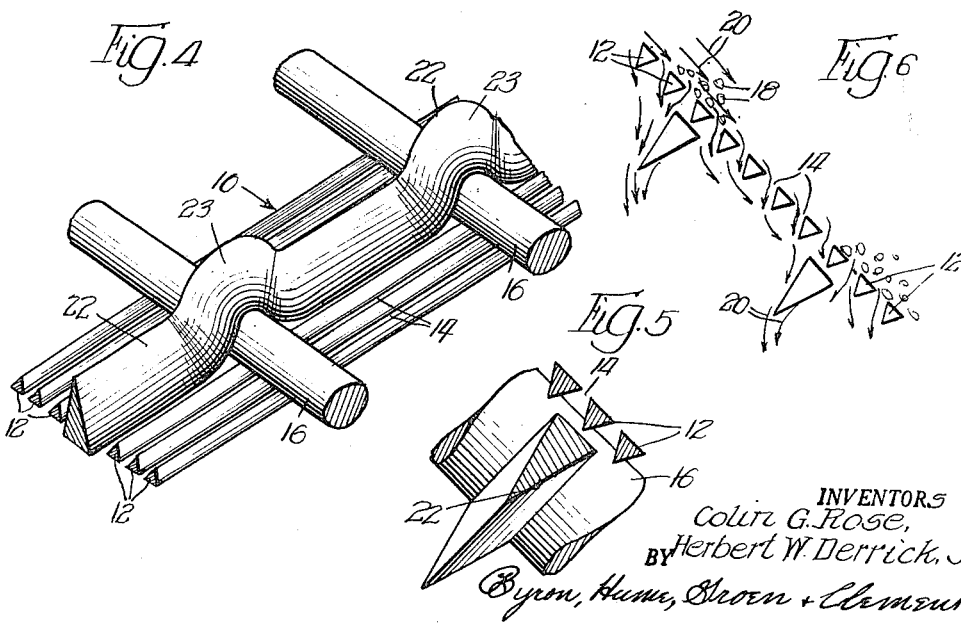

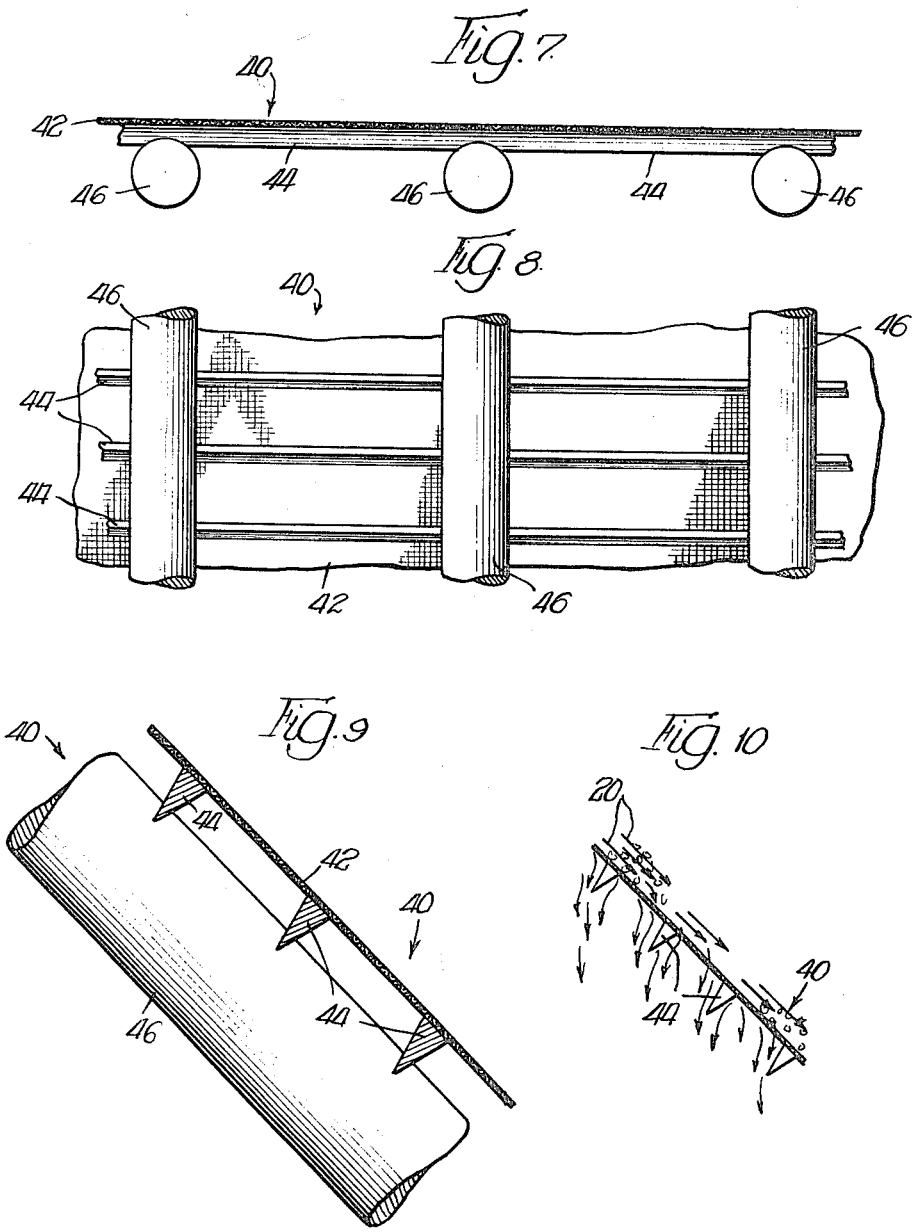

3,169,111
DEWATERING SCREEN HAVING LIQUID FILM DISRUPTING BARRIER
Colin G. Rose, 1587 E. Main St., Galesburg, Ill., and Herbert William Derrick, Jr., 358 Woodbridge Ave., Buffalo 14, N.Y.
Filed Feb. 8, 1960, Ser. No. 7,281
5 Claims. (Cl. 210—247)

This invention pertains to screens and other similar structures and in particular to a screen especially suited for the separation of liquids from solids.

The technological advances of methods and processing in manufacturing has acquired greater efficiency in the sorting of commodities, including sizing of solids and the separation of liquids from solids in numerous fields, such mining, smelting, chemicals, foods and the like. Most of the liquid and solids separation are done on screen surfaces as used in machinery, such as vibrating screens, trommels, filters and the like. These screen surfaces are of numerous types and include woven wire, punched plate, assembled rods, welded wire and rods, and the like, arranged to produce square, round, rectangular, and various other shaped slots of the predetermined size to allow liquids and solids to pass therethrough.

It has been found that many times during the separation of a liquid from a solid, the liquid after passing through the opening will tend to cling to the bottom of the screen and even fill the spaces or openings in the screen surface. When this happens, the solid retained on the top of the screen will continue to be in contact with the liquid so as to remain coated with the liquid, thus not effecting the separation. The adherence of the liquid on the bottom of the screen even in the areas adjacent the discharge is particularly prevalent where the screen is of the type that is tilted and in which the material moves thereacross from the uppermost to the lowermost portions thereof. In the tilted screen the adhering liquid will flow along the bottom in the direction of the material travel thus remaining in contact with the retained solids throughout the screening operation.

In order to eliminate this problem we have invented a screen having a foremost feature and object of directing the liquid away from the underneath side of the screen surface or the elements composing the same. This invention has the further feature and object of being usable without any substantial modification of the screening techniques that have been used heretofore and are presently being used. Furthermore, the invention has the additional feature and object of accelerating the separation of the liquid from the solid and particularly the flow of the liquid through the openings in the screens.

Briefly, the invention may be characterized as consisting of a screening surface having predetermined spaces through which liquid and undersized material may pass and a plurality of rod members in a substantially touching relationship with the underneath side of said screening surface and extending generally in a direction transverse to the direction of travel of material across the screen surface so as to interrupt the flow of adhering liquid across the underside of the screen.

These and other features and objects of the invention will be apparent upon reading of the specification with reference to the following drawings:

In the drawings:

FIGURES 1, 2 and 3 are top plan, end and bottom plan views, respectively, in elevation of the screen embodying the invention.

FIGURES 4 and 5 are fragmentary views in perspective showing the invention in detail.

FIGURE 6 is a diagrammatic illustration of the subject invention.

FIGURES 7 and 8 are end and bottom plan views, respectively, in elevation of a modification of the invention.

FIGURE 9 illustrates the modification shown in FIGURES 7 and 8, as mounted for operation.

FIGURE 10 is a diagrammatic illustration of the screen shown in FIGURES 7-9 in operation.

The arbitrary names of rods and crossbars have been selected for two of the elements used in the construction of one of the modifications embodying the invention. It is to be understood that these names are not to be construed as limitations as to size and character of these elements and that the dimensions may be varied to suit the particular application.

Referring now to FIGURES 1-3 there is shown one form of the screen embodying the invention generally denoted by the numeral 10. The screen 10 is composed of a plurality of small rods 12 which extend in a direction generally transverse to that in which the material travels over the screen surface.

In this particular instance the rods are of a triangular cross-section; however, this is merely by way of example, and is not to be considered as a limitation. The cross-sectional construction of the rods may be varied to suit the particular application and for example, may be circular, elliptical, rectangular, or of any other polygonal configuration.

As can be seen from FIGURES 1 and 2, the rods 12 are mounted in a closely spaced substantially parallel relationship. As a result, the rods 12 define a plurality of elongate spaces 14 which are of a predetermined size and through which the liquid and undersize material may pass.

The rods 12 are held in the aforementioned parallel closely spaced relationship by means of the crossbars 16 which are provided at suitable intervals. The crossbars 16 may be secured to the rods 12 by any suitable means, such as welding, soldering, brazing, tying, or by mechanical means such as screws, clips or other methods. The crossbars 16 have been shown by way of example as being of a circular cross-section; however, it is apparent that they can be of any size, shape or spacing necessary to fill the particular need.

Referring now to FIGURE 6, there is shown a diagrammatic illustration of the screen as it would be used. In particular, the screen 10 is generally used in an inclined or tilted position, with the material traveling transversely to the rods 12 from the uppermost edge to the lowermost edge. The purpose of the tilting or inclined arrangement is to facilitate the travel of the material being screened across the screen surface as the result of vibrations imparted to the same, since unless tilted, the surface will tend to slip under the material without causing it to be moved toward the exhaust side.

It has been found that when a solid, such as denoted by the numeral 18, is being separated from a liquid, as indicated by the arrows 20, that the latter will, after passing through the spaces between the bars 12, tend to cling to the bottom surface of the screen or in particular to the bottom edges of the screen elements, in this instance, the rods 12. In fact, the liquid will tend to run along the bottom surface as shown by the arrows, thus preventing the complete separation of the same from the solid. This problem is particularly prevalent where the spaces between the screen elements are relatively small, so that the force of gravity on the unsupported liquid film is less than the surface tension of the same. When this happens, it can be seen that the liquid will not fall off in the form of drops or as a stream as would be desired, but will merely cling to the screen so as to inhibit the flow of the remaining liquid through the screen spaces.

Referring back to FIGURES 1-3, it can be seen that the screen 10 includes the rods or barrier members 22 which are mounted on the underneath side of the screen. The rods 22 in that particular embodiment are shown as being in a touching relationship with the underneath or lower edge of at least one of the rod members 12 in the spaces intermediate the crossbars 16. The rods 22 are provided with spaced curved recesses 23 complementary to the crossbars 16 for accommodating the latter and to facilitate securing them together in some suitable means, such as welding, soldering, brazing, tying or by mechanical means such as screws, clips, or other methods. However, the rods 22 may be composed of short lengths substantially the same as the space between the crossbars 16 so as to eliminate the necessity of the curved recesses 23.

As can be seen in FIGURE 4, the rods 22 are of a substantially greater size than the rods 12. While this is by way of example, it is to emphasize that the sides of the rod 22 should be such that the liquid adhering to the underneath surface of the screen is actually directed therefrom as shown in FIGURE 6, and is not allowed to flow from the space between one pair of rods 22 to the next adjacent space. Thus the size of the rod 22 will be at least in part dependent upon the surface tension of the liquid that is being separated. It is conceivable that for liquids having a relatively low surface tension, the rod 22 may be of a smaller size than in instances where liquids of a relatively high surface tension are being separated from a solid.

As shown in FIGURE 6, the liquid, at least a portion thereof, after passing through the spaces 14 then proceeds to travel along the underneath side of the screen. Once the liquid reaches the rod 22, it is then directed away from the screen along the side, until it reaches the apex of the rod. At this point the liquid is then drained away from the screen as the result of the force of gravity, since it cannot flow up the adjacent side contrary to the laws of gravity, nor due to the spacing between the rods 22 it cannot bridge the gap between the latter. By spacing the rods 22 at preselected distances it is possible to control the amount of accumulation on the underneath side of the screen in order to achieve the optimum results during the screening operation.

As was mentioned previously, the subject invention not only eliminates the problem of liquid adherence to the underneath side of the screen, but further, it accelerates the separation of the liquid from the solid. This acceleration is due to the fact that there is an increase in the velocity of flow away from the bottom of the screen as the liquid flows along the side of the rod 22. The increase in velocity causes a suction effect to be placed on the liquid that is not yet passed through the screen spaces thus accelerating the flow of the liquid within the spaces and not yet received therein.

A second modification of the subject invention is shown in FIGURES 7–10 and is generally denoted by the numeral 40. The screen 40 is of a reticulated construction and consists of the woven wire screen 42 which may be made of any suitable material that will fulfill the needs of the application. The screen 42 is mounted on the spaced rod members 44 which extend in a direction generally transverse to that in which the material passes over the screen surface. The screen 42 may be secured to the rod members 44 in any suitable manner as described previously. The rods 44 are in turn secured in any suitable manner to the crossbars 46 which are adapted to be received within the mounting fixtures of the screening machinery (not shown).

As shown in FIGURES 9 and 10, the screen 40 is normally tilted so that the material passes from the uppermost to the lowermost edges. In this modification the liquid after passing through the screen openings generally tends to adhere to the underneath side of the woven wire screen. This is particularly true in this instance where the screen openings are relatively small as would be the case with fine mesh screens. Accordingly, as the liquid accumulates on the underneath side, it tends to flow to some lower portion of the screen. However, this flow is limited in that the liquid is directed away from the screen surface by the rods 44 as described with reference to FIGURE 6.

The rods or barrier members 22 and 44 have been shown as being triangular in cross-section. While this does represent a preferred embodiment of these rods, it is to be noted that this is not by way of limitation but merely by way of example. In fact, rods of other polygonal configurations and in fact of circular or elliptical configurations may be used in the practice of the invention.

It is now apparent that the subject invention may be used wherever the problem of liquid-solid separation is encountered. This invention permits the use of heretofore conventional and known screening techniques, without interfering with the same, and at the same time facilitates and accelerates the separation of a liquid from a solid.

Although certain specific forms of the invention have been set forth hereinbefore, it is apparent that these are merely by way of example and in no manner to be construed as limitations. Accordingly, it is contemplated that certain modifications may be made within the scope of the claims without departing from the spirit of the invention.

What is claimed is:

1. A screening device comprising a plurality of elongate rod members mounted in a closely spaced substantially parallel relationship, said elongate rod members forming a screening surface composed of a plurality of elongate openings generally transverse to the direction of travel of material across said screening surface, said screening surface being tilted a plurality of crossbars for maintaining said rod members in said closely spaced substantially parallel relationship, a plurality of barrier members mounted adjacent the underneath sides of said rod members and extending transverse to the normal direction of travel of the material across said screening surface, said barrier members projecting downwardly from the underneath sides of said rod members so that liquid adhering to the bottom thereof and attempting to travel in said direction of travel is prevented from doing such.

2. A screening device comprising a plurality of elongate rod members mounted in a closely spaced substantially parallel relationship, said elongate rod members forming a screening surface composed of a plurality of elongate openings generally transverse to the direction of travel of material across said screening surface, said screen surface being tilted downwardly in the direction of travel, a plurality of crossbars for mounting said rod members extending in a direction generally transverse to said rod members, a plurality of elongate barrier members mounted adjacent the underneath sides of said rod members and extending in a direction generally parallel with said rod members, said barrier members projecting downwardly from the underneath sides of said rod members so that liquid adhering to the bottom thereof and attempting to travel in said direction of travel is prevented from doing such.

3. A screening device according to claim 2 wherein said rod members are of a triangular cross-section with one side of each cooperating with similar sides of the other rod members to form said screening surface.

4. A screening device according to claim 3 wherein said barrier member is of a triangular cross-section with one side thereof being in touching relationship with the underneath side of said screen.

5. A screening device comprising a screen surface composed of a plurality of rod-like members mounted in a closely spaced relationship to define a plurality of openings of predetermined size for the separation of liquids from solid materials, at least half of said rod-like members extending in a direction substantially transverse to the direction of travel of the retained material across the screen surface, said screen surface being tilted downwardly in the direction of material travel, a plurality of barrier members mounted adjacent the underneath side of said screening surface in substantially touching relationship therewith, said barrier members extending transversely to said direction of travel and of such a construction that the liquid normally adhering to the underneath side of the screen surface is directed therefrom and drained.

References Cited in the file of this patent

UNITED STATES PATENTS

| | | |
|---|---|---|
| 323,772 | Allen | Aug. 4, 1885 |
| 1,743,974 | Mallet | Jan. 14, 1930 |
| 1,982,244 | Davis | Nov. 27, 1934 |
| 2,690,265 | Bixby | Sept. 28, 1954 |

FOREIGN PATENTS

| | | |
|---|---|---|
| 23,520 | Sweden | June 11, 1907 |